US006944138B1

(12) United States Patent
Song

(10) Patent No.: US 6,944,138 B1
(45) Date of Patent: Sep. 13, 2005

(54) APPARATUS FOR A MOBILE COMMUNICATION SYSTEM FOR PROVIDING AN ATM-BASED SWITCHING AND ROUTING CONNECTING SCHEME

(75) Inventor: Doug-Young Song, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 09/452,608

(22) Filed: Dec. 1, 1999

(30) Foreign Application Priority Data

Dec. 1, 1998 (KR) .................................. 98-52237

(51) Int. Cl.[7] ............................ H04B 7/00; H04L 12/56
(52) U.S. Cl. ............................... 370/310.1; 370/395.1; 370/395.6; 370/466
(58) Field of Search ................... 370/395.1, 395.51, 370/395.6, 395.64, 395.5, 401, 310.1, 310.2, 370/328, 329, 338, 465, 466, 474; 455/560, 455/561

(56) References Cited

U.S. PATENT DOCUMENTS

| | | | | |
|---|---|---|---|---|
| 5,793,757 | A | * | 8/1998 | Uddenfeldt ................. 370/335 |
| 5,875,192 | A | * | 2/1999 | Cam et al. ................ 370/395.7 |
| 5,953,339 | A | * | 9/1999 | Baldwin et al. ............ 370/397 |
| 6,081,715 | A | * | 6/2000 | La Porta et al. ............ 455/445 |
| 6,128,659 | A | * | 10/2000 | Subblah et al. ............. 709/225 |
| 6,331,981 | B1 | * | 12/2001 | Harth et al. .............. 370/395.1 |
| 6,373,834 | B1 | * | 4/2002 | Lundh et al. ................ 370/350 |
| 6,445,683 | B1 | * | 9/2002 | Nobuyasu et al. ........ 370/310.1 |
| 6,449,276 | B1 | * | 9/2002 | Subbiah et al. .......... 370/395.6 |
| 6,483,838 | B1 | * | 11/2002 | Ostman et al. ......... 370/395.31 |

FOREIGN PATENT DOCUMENTS

| | | |
|---|---|---|
| EP | 0 872 983 | 10/1998 |
| JP | 08-186576 | 7/1996 |
| JP | 10-341242 | 12/1998 |
| JP | 11-346217 | 12/1999 |

OTHER PUBLICATIONS

Japanese Office Action dated Dec. 17, 2002, issued in a counterpart application, namely Appln. No. 2000 - 586021.
Hiroshi Fujiya et al., "Realtime Voice Communications Over ATM", Technical Report of IEICE, IN 97-62 (Jul. 1997).

* cited by examiner

*Primary Examiner*—John Pezzlo
*Assistant Examiner*—Saba Tsegaye
(74) *Attorney, Agent, or Firm*—Dilworth & Barrese LLP

(57) ABSTRACT

A mobile communication system introducing ATM, AAL2 and IMA techniques in order to efficiently transmit high-speed information and multimedia traffic having various properties, and to increase transmission efficiency in a limited transmission link or transmission band. An ATM cell processing device for a mobile communication system comprises an ATM interface for receiving ATM cells dispersedly transmitted or distributed over a plurality of physical links and restoring the received ATM cells into one ATM cell stream; an AAL2 (ATM Adaptation Layer 2) cell processor for switching at least one AAL2 packet multiplexed within each ATM cell in the ATM cell stream according to routing information provided during call setup, multiplexing the switched AAL2 packets according to ATM connections, and creating an internal ATM cell having the same format as the received ATM cells; and an ATM switch for switching the internal ATM cell according to the routing information.

11 Claims, 14 Drawing Sheets

| VCI_I | CID_I | VCI_o | CID_o | PT_I | PT_o |
|---|---|---|---|---|---|
| 41 | ② | 83 | ③ | 0 | 1 |
| 42 | 7 | 84 | 7 | 1 | 2 |
| 43 | 2 | 83 | 2 | 2 | 3 |
| 44 | 5 | 81 | 5 | 3 | 0 |

*FIG. 5A*

| VCI_I | CID_I | VCI_o | CID_o | PT_I | PT_o |
|---|---|---|---|---|---|
| 41 | 2 | 81 | 4 | 0 | 0 |
| 42 | ⑨ | 84 | ① | 1 | 3 |
| 43 | 6 | 82 | 6 | 2 | 1 |
| 44 | 9 | 84 | 9 | 3 | 2 |

*FIG. 5B*

APPARATUS FOR A MOBILE COMMUNICATION SYSTEM FOR PROVIDING AN ATM-BASED SWITCHING AND ROUTING CONNECTING SCHEME

PRIORITY

This application claims priority to an application entitled "Mobile Communication System Having ATM-based Connecting Scheme" filed in the Korean Industrial Property Office on Dec. 1, 1998 and assigned Serial No. 98-52237, the contents of which are hereby incorporated by reference.

BACKGROUND OF THE INVENTION

1. Field of the Invention

The present invention relates generally to a connecting scheme for a mobile communication system, and in particular, to a mobile communication system having a scheme for performing ATM-based connections between a controller and a transceiver subsystem of a base station, and between the base station and a mobile switching center.

2. Description of the Related Art

A typical mobile communication system includes a mobile switching center (MSC), a base station (BS) connected to the MSC by wire, and a mobile terminal or station (MT) with a wireless connection to the BS. The base station includes a base station controller (BSC) and a base station transceiver subsystem (BTS).

In the conventional mobile communication system, a synchronous transfer mode (STM) or a connectionless packet transfer mode is used for the connection between the mobile switching center and the base station controller and the connection between the base station controller and the base station transceiver subsystem. Therefore, when connecting the mobile switching center to the base station controller or connecting the base station controller to the base station transceiver subsystem using a plurality of physical links, it can happen that the traffic becomes concentrated on just one of the physical links, thereby reducing the utilization efficiency of the overall system.

In addition, in the STM system, each channel band (i.e., time slot) is assigned to a specific source for transmitting the traffic. Therefore, when the source has no traffic to transmit, the corresponding channel remains empty and this empty channel cannot be used by other sources. This reduces traffic transmission efficiency.

In the near future, mobile communication systems will provide multimedia traffic services including voice, data and image information. Voice, data and image information have different QoS (Quality of Service) requirements with respect to data loss and transmission delay, and it is necessary to process the traffic according to these QoS requirements. For example, with regard to voice transmission, the service quality is not greatly affected by minor data loss, but is drastically degraded when transmission delay occurs. On the contrary, with regard to data transmission, the service quality is not greatly affected by transmission delay, but is very susceptible to the effects of data loss. However, in the STM or connectionless packet transfer mode mobile communication system, it is not easy to manage the service quality according to the type of media or type of traffic so that it is not possible to provide optimal service quality for each of the respective media.

SUMMARY OF THE INVENTION

It is, therefore, an object of the present invention to increase the utilization efficiency of physical links in a mobile communication system.

It is another object of the present invention to increase the transmission efficiency of the traffic in a mobile communication system.

It is further another object of the present invention to enable a multimedia traffic service in a mobile communication system.

To achieve these and other objects, a mobile communication system according to an embodiment of the present invention introduces an ATM (Asynchronous Transfer Mode) technique in order to efficiently transmit high-speed information and multimedia traffic having various properties. In addition, the mobile communication system introduces AAL2 (ATM Adaptation Layer 2) and IMA (Inverse Multiplexing for ATM) techniques in order to increase transmission efficiency when using a limited transmission link or transmission band. In ATM, an information unit having a fixed size, called a "cell", is used.

In accordance with a first aspect of the present invention, an ATM cell processing device comprises an ATM interface for receiving ATM cells dispersedly transmitted or distributed over a plurality of physical links and restoring the received ATM cells into one ATM cell stream; an AAL2 cell processor for switching at least one AAL2 packet multiplexed within each ATM cell in the ATM cell stream according to routing information provided during call setup, multiplexing the switched AAL2 packets according to ATM connections, and creating an internal ATM cell having the same format as the received ATM cells; and an ATM switch for switching the internal ATM cell according to the routing information.

The ATM interface includes a plurality of physical links for receiving the dispersedly transmitted or distributed ATM cells; and an IMA (Inverse multiplexing for ATM) processor for IMA processing the received ATM cells, to restore the IMA processed ATM cells to the ATM cell stream.

The AAL2 cell processor includes an ATM interface for ATM layer processing the received ATM cell according to the routing information, and outputting the ATM layer-processed received ATM cells as an input AAL2 cell; an AAL2 synchronizer for synchronizing each AAL2 packet by detecting a starting point of the AAL2 packets which are included in the input AAL2 cell on a packet unit basis; an AAL2 switch for switching the synchronized AAL2 packets according to the routing information; an AAL2 formatter for multiplexing the switched AAL2 packets according to virtual channels, and generating an output AAL2 cell having the same format as the input AAL2 cell; a CID (Channel Identifier) changer interconnected between the AAL2 synchronizer and the AAL2 switch, for determining whether there are packets to be switched to the identical ATM connection at the same time out of the packets to be switched by the AAL2 switch by using the cell routing information, and changing, when there are said packets, the CIDs of the packets such that the CIDs of the packets are not identical to each other; and an internal ATM cell formatter for attaching an ATM cell header and a routing tag to said output AAL2 cell and generating a resulting internal ATM cell.

In accordance with a second aspect of the present invention, an ATM cell processing device comprises an ATM switch for switching an input ATM cell stream according to routing information; an ATM interface having a plurality of physical links, for dispersedly transmitting or distributing a transmission ATM cell stream to the physical links, and IMA processing the ATM cell stream dispersedly received over the physical links to restore the received ATM cell stream into one ATM cell stream; and an AAL2 cell processor for directly outputting the ATM cell stream switched by the ATM switch through a first path, receiving the restored ATM cell stream through a second path, switching at least one AAL2 packet multiplexed within each ATM cell in the received ATM cell stream according to routing information provided during call setup, multiplexing the switched AAL2 packets according to ATM connections, and creating an internal ATM cell having a format proper to be switched by the ATM switch.

In accordance with a third aspect of the present invention, a base station transceiver subsystem in a mobile communication system, comprises an RF (Radio Frequency) processor wirelessly connectable to a mobile terminal, for processing information transmitted to and received from the mobile terminal; a converter for converting the information received from the RF processor to an ATM cell stream, and an input ATM cell stream to a format proper to be processed by the RF processor; an ATM switch for switching the ATM cell stream converted by the converter according to the routing information; an AAL2 cell processor for directly outputting the ATM cell stream switched by the ATM switch through a first path, switching at least one AAL2 packet multiplexed within each ATM cell in the ATM cell stream received through a second path according to routing information provided during call setup, multiplexing the switched AAL2 packets according to ATM connections, and creating an internal ATM cell having a format proper to be switched by the ATM switch; and an ATM interface having a plurality of physical links, for IMA processing the ATM cell stream output through the first path to dispersedly transmit or distribute the ATM cell stream to the physical links, and IMA processing the ATM cells received over the physical links to restore the received ATM cells into one ATM cell stream and output the ATM cell stream through the second path.

In accordance with a fourth aspect of the present invention, a mobile communication system includes a base station having a transceiver and a controller, the base station having a wireless connection to a mobile terminal, and a mobile switching center connected to the base station by a wire.

The base station transceiver includes an RF processor for processing information transmitted to and received from the mobile terminal; a converter for converting the information received from the RF processor to an ATM cell stream, and an input ATM cell stream to a format proper to be processed by the RF processor; a first ATM cell processor having a first path where the first ATM cell processor directly outputs the ATM cell stream converted by the converter, and a second path where the first ATM cell processor multiplexes an input ATM cell stream with respect to each ATM cell after AAL2 switching, and outputs the multiplexed ATM cell stream to the converter after ATM switching; and a first ATM interface having a plurality of first physical links, for IMA processing the ATM cell stream output through the first path to dispersedly transmit the ATM cell stream to the first physical links, and IMA processing the ATM cells received over the first physical links to restore the received ATM cells into one ATM cell stream and output the ATM cell stream through the second path.

The base station controller includes a second ATM interface having a plurality of second physical links, connectable to the first ATM interface through the second physical links; a second ATM cell processor having a first path where the second ATM cell processor directly outputs an ATM cell stream received at the second ATM interface, and a second path where the second ATM cell processor multiplexes an input ATM cell stream with respect to each ATM cell after AAL2 switching, and outputs the multiplexed ATM cell stream to the second ATM interface after ATM switching; and a third ATM interface having a plurality of third physical links, for IMA processing the ATM cell stream output through the first path of the second ATM cell processor to dispersedly transmit or distribute the ATM cell stream over the third physical links, and IMA processing the ATM cells received over the third physical links to restore the received ATM cells to an ATM cell stream and output the restored ATM cell stream through the second path of the second ATM cell processor.

The mobile switching center includes a fourth ATM interface having a plurality of fourth physical links, connectable to the third ATM interface through the fourth physical links; a third ATM cell processor having a first path where the third ATM cell processor directly outputs the ATM cell stream received at the fourth ATM interface, and a second path where the third ATM cell processor multiplexes an input ATM cell stream with respect to each ATM cell after AAL2 switching, and outputs the multiplexed ATM cell stream to the fourth ATM interface after ATM switching; and a fifth ATM interface having a plurality of fifth physical links, for IMA processing the ATM cell stream output through the first path of the third ATM cell processor to dispersedly transmit or distribute the ATM cell stream over the fifth physical links, and IMA processing the ATM cells received over the fifth physical links to restore the received ATM cells to an ATM cell stream and output the restored ATM cell stream through the second path of the third ATM cell processor.

BRIEF DESCRIPTION OF THE DRAWINGS

The above and other objects, features and advantages of the present invention will become more apparent from the following detailed description when taken in conjunction with the accompanying drawings in which:

FIGS. 5A and 5B are diagrams illustrating the look-up memory of FIGS. 2A and 2B according to an embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In a mobile communication system according to an embodiment of the present invention, the connection between the mobile switching center and the base station controller or between the base station controller and the base station transceiver subsystem is made based on the ATM (Asynchronous Transfer Mode) technique rather than the STM or connectionless packet transfer mode technique. Although the invention will be described hereinbelow with reference to a mobile communication system, it is also possible to apply the invention to every ATM-based communication system employing IMA (Inverse Multiplexing for ATM) and AAL2 techniques.

The invention has the following features. First, the invention uniformly disperses the traffic to a plurality of physical links by employing the IMA technique, thereby increasing utilization efficiency of the physical links. Second, since the invention uses the ATM technique, the channel band (virtual connection) is not fixed to a specific source. Therefore, any source having traffic to transmit can transmit the traffic through an available channel band, thus increasing the transmission efficiency of the traffic flow. Third, the invention sets an ATM virtual connection on the physical link by using the AAL2 (ATM Adaptation Layer 2) technique, and transmits the traffic over the set physical link. In ATM, an information unit having a fixed size, called a "cell", is used. Therefore, when the channel traffic to be transmitted is smaller in size than the payload of the cell, more than one traffic channel can be transmitted by multiplexing. Accordingly, as long as there is channel traffic to transmit, a cell is not transmitted with the payload being partially empty, thus increasing transmission efficiency. Fourth, by employing the ATM technique, the invention can control the service quality (loss and delay) according to ATM requirements. That is, when each service requires different quality, it is possible to satisfy the required service quality by setting the ATM connection suitable for the service quality.

Figure 1:
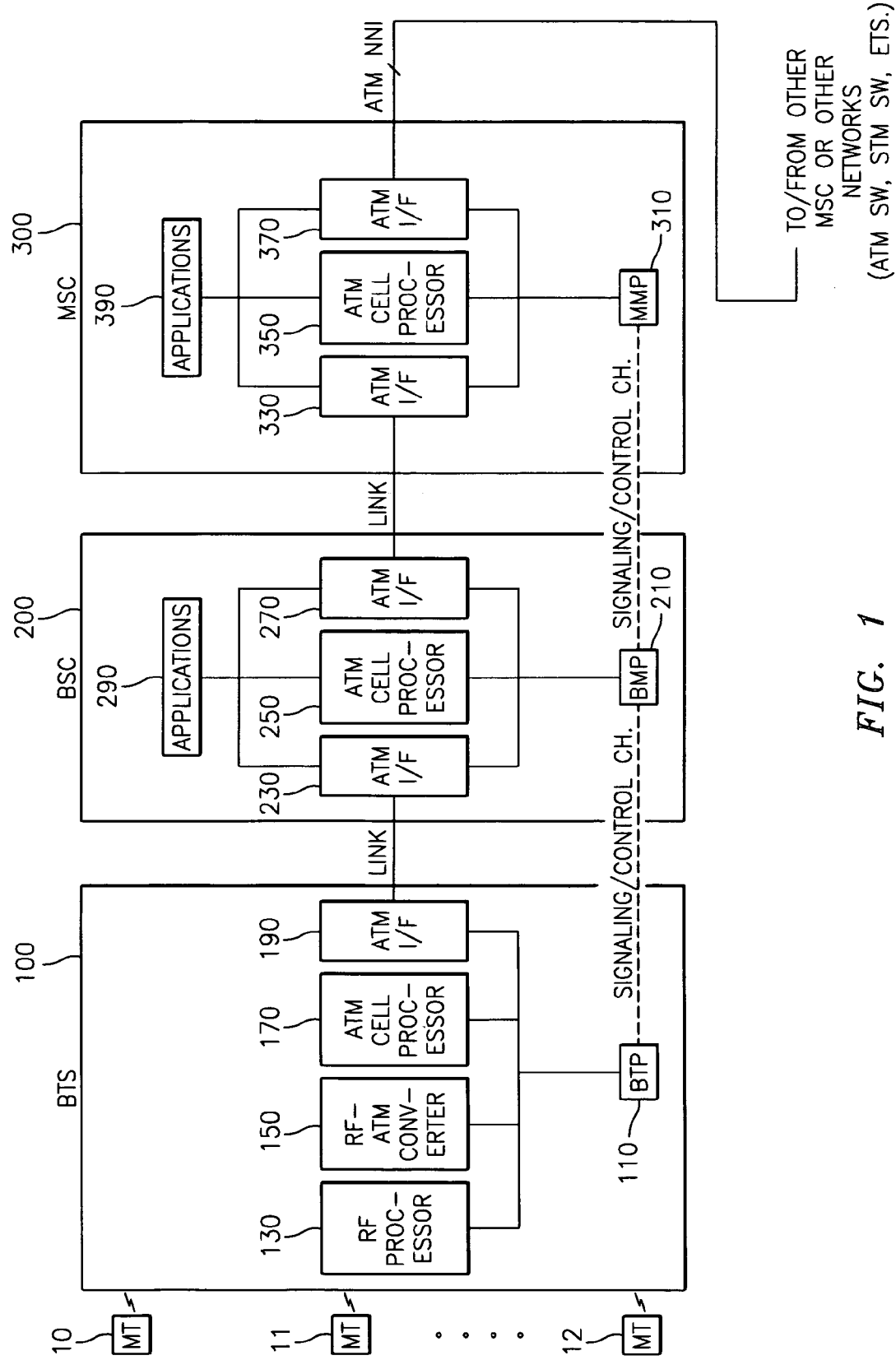
FIG. 1 is a block diagram illustrating a mobile communication system having an ATM-based connecting scheme according to an embodiment of the present invention.

FIG. 1 shows a mobile communication system having an ATM-based connecting scheme according to an embodiment of the present invention. The mobile communication system includes a base station transceiver subsystem (BTS) 100, a base station controller (BSC) 200, and a mobile switching center (MSC) 300. More specifically, the BTS 100, the BSC 200 and the MSC 300 have ATM cell processors 170, 250 and 350, respectively. The BTS 100 includes an ATM interface 190 for connection with the BSC 200; the BSC 200 includes an ATM interface 230 for connection with the BTS 100 and an ATM interface 270 for connection with the MSC 300; and the MSC 300 includes an ATM interface 330 for connection with the BSC 200. Further, the MSC 300 includes an ATM interface 370 for ATM connection with another MSC or another network (e.g., ATM or STM). The ATM interface 230 in the BSC 200 can also be connected to a plurality of BTSs.

Referring to FIG. 1, the BTS 100 includes a BTS main processor (BTP) 110, an RF (Radio Frequency) processor 130, an RF-ATM converter 150, an ATM cell processor 170 and the ATM interface 190. The BTP 110 controls the overall operation of the BTS 100. The RF processor 130 exchanges radio information with mobile terminals (MT) 10–12, for radio connection (or access) to the mobile terminals 10–12. The RF processor 130 includes an antenna, a duplexer, a receiver, a transmitter and a baseband processor. The RF-ATM converter 150 converts the radio information received from the mobile terminals 10–12 to information having a format suitable for a fixed network, and converts information received from the fixed network to a format suitable for the radio network. In an embodiment of the present invention, the RF-ATM converter 150 performs ATM adaptation layer processing and multiplexing on the radio traffic received from the mobile terminals 10–12, and then converts the processed radio traffic to an ATM cell proper for the ATM network. The ATM adaptation layer processing performs convergence processing on the packetized radio information, reassembles the convergence-processed packet information into a plurality of cells, and inserts a header at the head of each cell to create an information field. The ATM adaptation layer processing corresponds to AAL2 processing (unlike AAL2 processing, AAL5 processing attaches only a trailer at the end of each cell). The header is inserted in each information field created by the ATM adaptation layer processing, thereby creating the ATM cell. For converting the information received from the fixed network to the format suitable for the radio network, the RF-ATM converter 150 performs the reverse operation.

Figure 2A:
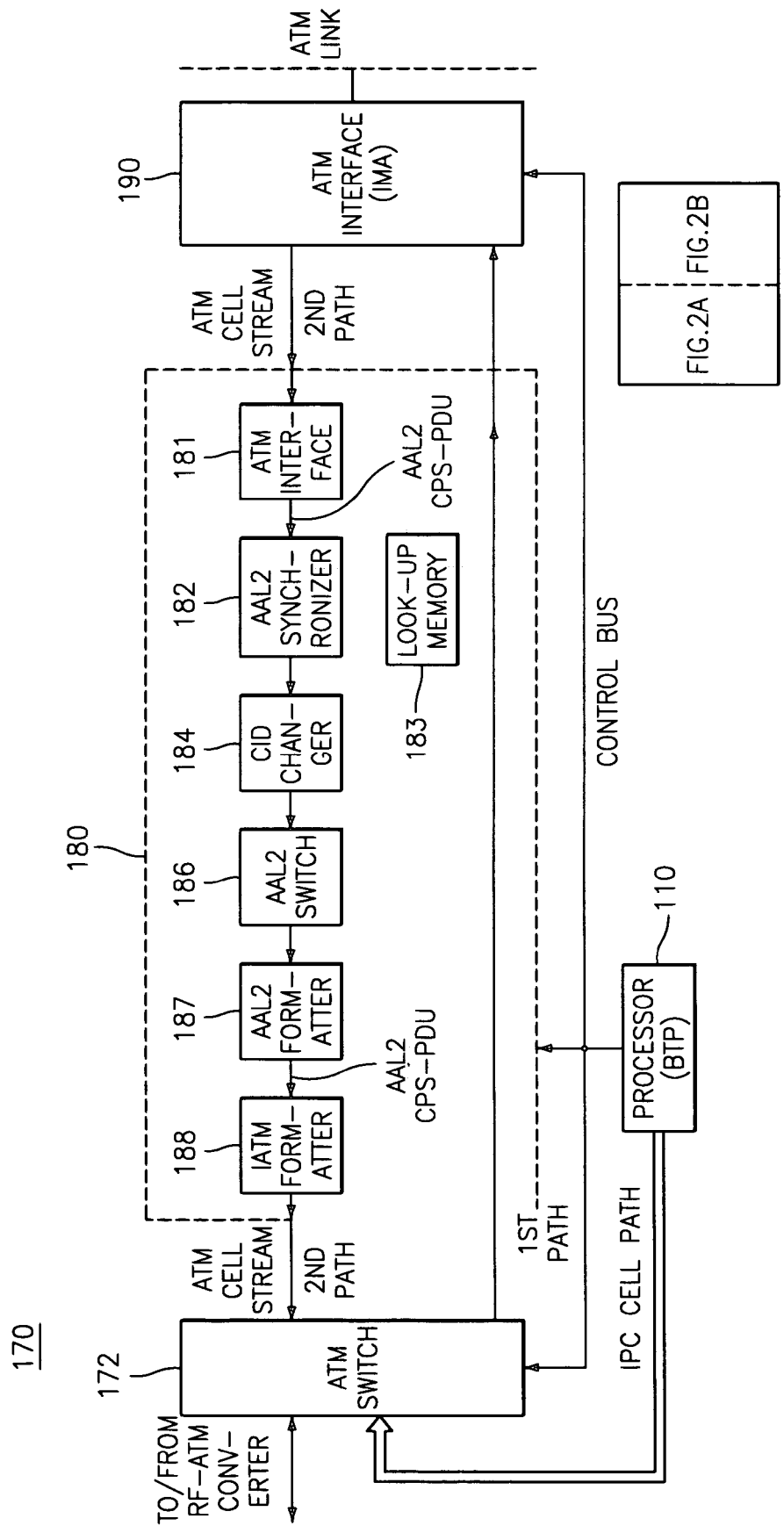
FIGS. 2A and 2B are detailed block diagrams illustrating the ATM cell processors shown in FIG. 1.
Figure 2B:
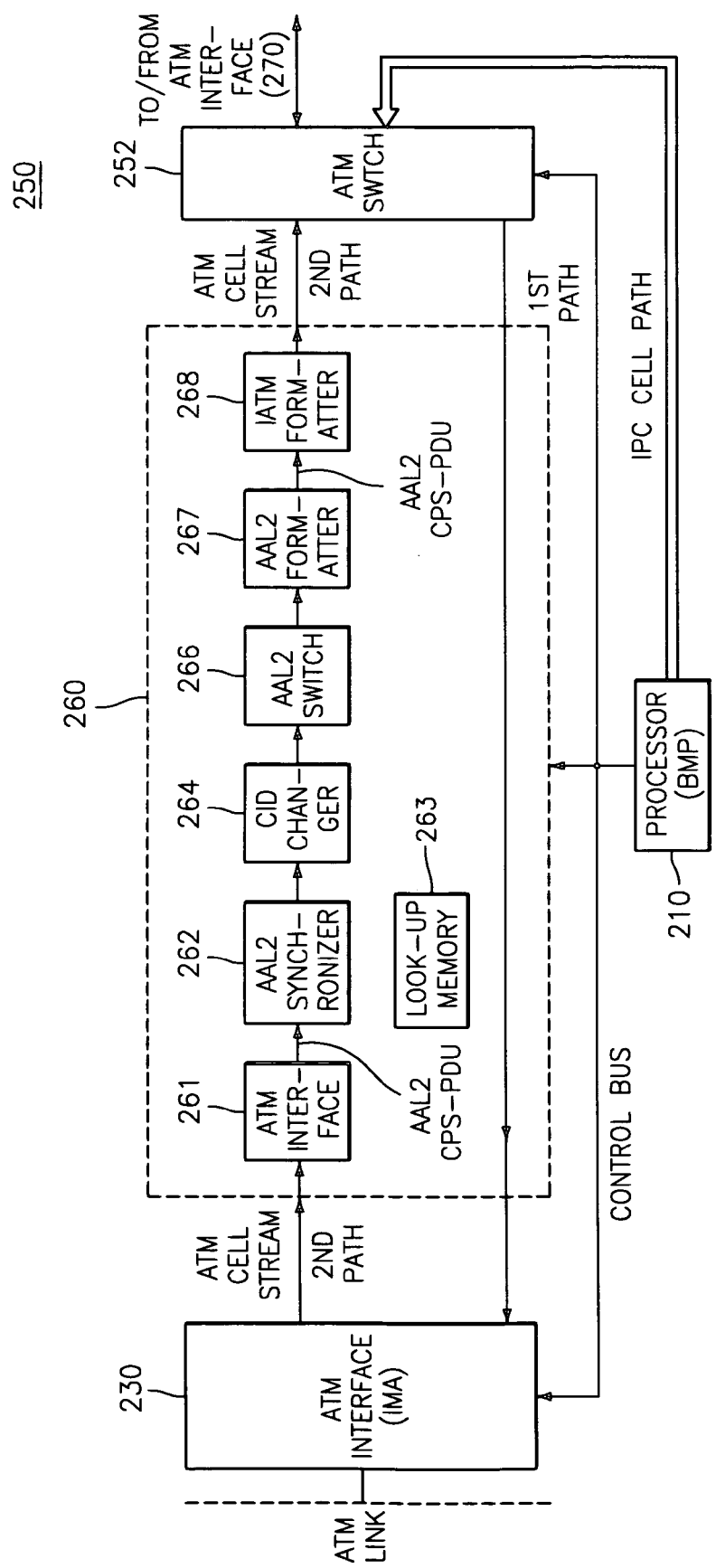

FIGS. 2A and 2B show ATM cell processors 170 and 250 included in the BTS 100 and the BSC 200, respectively. More specifically, FIG. 2A shows the detailed structure of ATM cell processor 170 in the BTS 100 and its connection with the ATM interface 190, and FIG. 2B shows the detailed structure of the ATM cell processor 250 in the BSC 200 and its connection with the ATM interface 230. Though not illustrated separately, the ATM cell processor 350 in the MSC 300 preferably has the same structure and operation as that of the ATM cell processors 170 and 250.

Referring to FIG. 2A, the ATM cell processor 170, which performs ATM & AAL2 routing and switching as well as an AAL2 multiplexing, includes an ATM switch 172 and an AAL2 cell processor 180. The ATM switch 172 receives an ATM cell from the RF-ATM converter 150, determines a routing path for the received ATM cell according to switching information provided from the processor BTP 110, and then switches the ATM cell according to the determined routing path. The switching information is received from the upper layer processor BTP 110 during call setup, and is stored in a routing table of the ATM switch 172 until the call is released. The ATM switch 172 is provided with the switching information to be stored in its routing table from the processor 110 via a control bus, and switches the ATM cell to a routing path determined according to the switching information stored in the routing table. The switching information stored in the routing table of the ATM switch 172 includes an output virtual path identifier (VPI), an output virtual channel identifier (VCI) and an output channel number, and the routing path is determined by analyzing the VP/NCI of an input ATM cell and using the switching information. The switching information stored in the routing table of the ATM switch 172 and the information for the CID (Channel Identifier) changing and AAL2 switching operation of the AAL2 cell processor 180 are received from the processor 110 during call setup and stored in a look-up memory 183 of the AAL2 cell processor 180; this information is shown in FIGS. 5A and 5B, by way of example, and is used until the call is released. In the ATM cells (ATM cell stream) switched by the ATM switch 172, a plurality of AAL2 packets are multiplexed. Such an ATM cell stream has the structure shown in FIG. 3, and is applied to the ATM interface 190 having the structure shown in FIG. 12.

Figure 12:
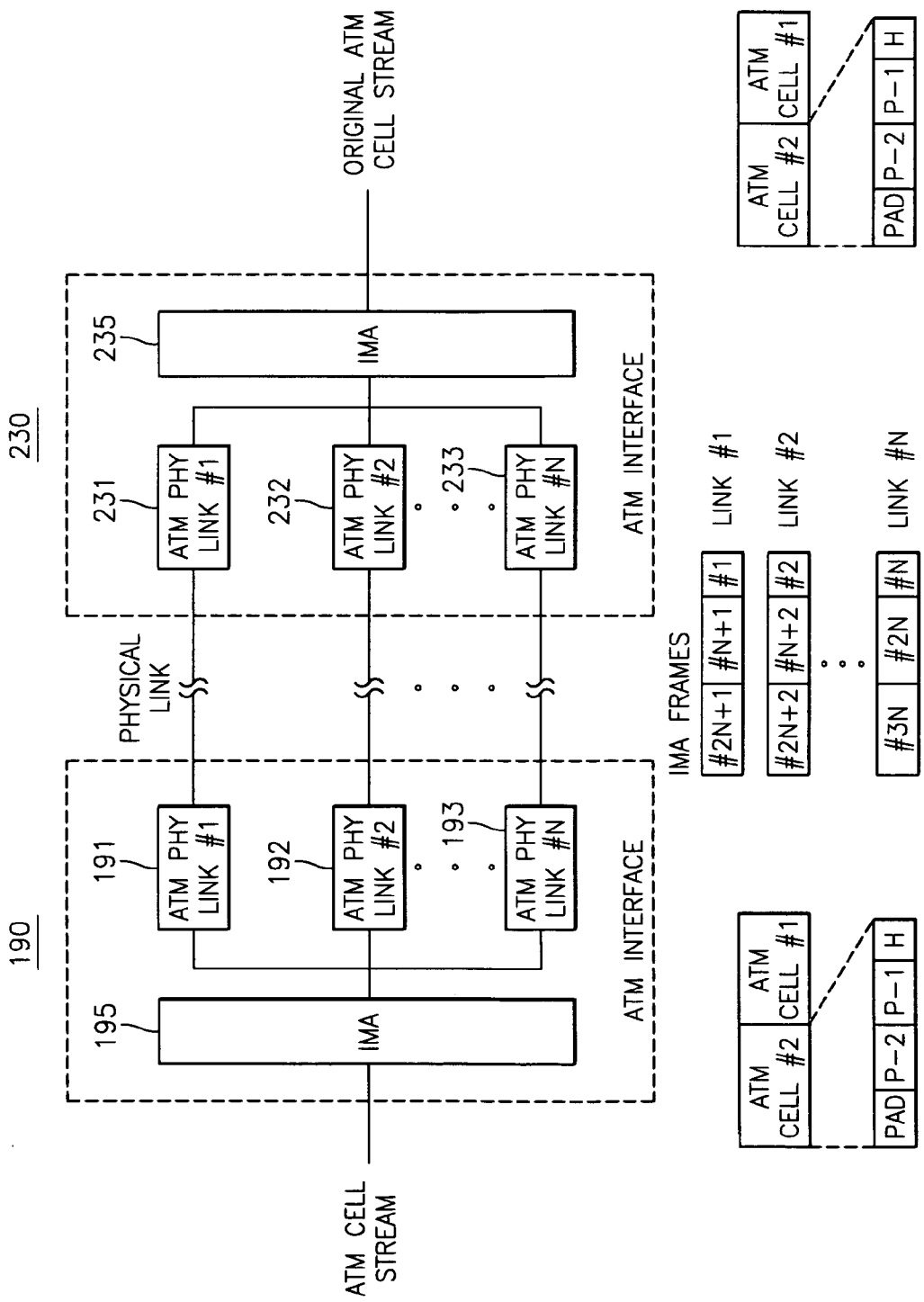
FIG. 12 is a detailed block diagram illustrating the ATM (IMA) interface of FIGS. 2A and 2B according to an embodiment of the present invention.

FIG. 12 shows the detailed structure of the ATM interfaces 190 and 230 included in the BTS 100 and the BSC 200, respectively. Though not illustrated separately, it should be noted that the ATM interface 270 in the BSC 200 and the ATM interfaces 330 and 370 in the MSC 300 preferably have the same structure.

Referring to FIG. 12, the ATM interface 190, which performs an IMA function and an ATM physical layer function, includes an IMA processor 195 and a plurality of physical links 191–193. The IMA processor 195 receives the ATM cell stream, and disperses the AAL2 packets (or ATM cells) multiplexed in the received ATM cell stream to the physical links. That is, the IMA processor 195 sequentially disperses the ATM cell stream to Nth physical links PHY_LINK_#1 to PHY_LINK_#N. For example, if the ATM cell stream is comprised of ATM cells CELL#1-CELL#N, the IMA processor 195 transmits CELL#1 over the first physical link 191, CELL#2 over the second physical link 192, and CELL#N over the Nth physical link 193. The physical links can be a T1 trunk (1.544 Mbps), a E1 trunk (2.048 Mbps), a DS3 trunk (45 Mbps) and a E3 trunk (34 Mbps). In an embodiment of the present invention, eight E1 trunks are used for the physical links.

The respective cells of the ATM cell stream, dispersedly transmitted by the IMA processor 195 over the first to Nth physical links 191–193, are applied to an IMA processor 235 in the ATM interface 230 of the BSC 200 over the physical links 231–233. The IMA processor 235 then restores the original ATM cell stream which is identical in format to the input ATM cell stream of the IMA processor 195 in the BTS 100. That is, the IMA processor 235 restores the dispersed ATM cells to the ATM cell stream. The restored ATM cell stream is applied to the ATM cell processor 250 in the BSC 200.

For more information about the ATM cell stream restoring method, please see "Inverse Multiplexing for ATM (IMA) Specification Version 1.0", AF-PHY-0086.000, ATM Forum Technical Committee, July 1997.

Referring to FIG. 2B, the ATM cell processor 250 in the BSC 200 includes an ATM switch 252 and an AAL2 cell processor 260, and performs the same operation as the ATM cell processor 170 of FIG. 2A. The AAL2 cell processor 260 includes an ATM interface 261, an AAL2 synchronizer 262, a look-up memory 263, a CID changer 264, an AAL2 switch 266, an AAL2 formatter 267 and an internal ATM (IATM) formatter 268. Performing AAL2 processing on the ATM cell stream, into which a plurality of ATM cells (AAL2 packets) are multiplexed by the AAL2 cell processor 260, increases the efficiency of the transmission bandwidth and prevents transmission delay. Since the ATM cell processor 250 of the BSC 200 performs AAL2 processing on the ATM cell stream restored by the IMA processor 230 in the same manner as in the ATM cell processor 170 of the BTS 100, the detailed operational description of the ATM cell processor 250 will be replaced with a description of the ATM cell processor 170 of the BTS 100, which will be made below with reference to FIG. 2A.

Referring to FIG. 2A, on a first path, the AAL2 cell processor 180 directly transmits the ATM cell stream switched by the ATM switch 172 to the ATM interface 190. However, on a second path, the AAL2 cell processor 180 is provided with the ATM cell stream restored by the ATM cell interface 190 after being dispersed by the ATM interface 230 of the BSC 200. The second path is from the ATM interface 190 to the ATM switch 172 through the AAL2 cell processor. The AAL2 cell processor 180 includes an ATM interface 181, an AAL2 synchronizer 182, a look-up memory 183, a CID changer 184, an AAL2 switch 186, an AAL2 formatter 187 and an IATM formatter 188. The ATM interface 181 performs ATM layer processing on an ATM cell received after physical layer processing, and outputs the processed AAL2 CPS-PDU (Common Part Convergence Sublayer-Protocol Data Unit, hereinafter, referred to as an AAL2 cell) having the format shown in FIG. 3 to the AAL2 synchronizer 182.

The physical layer processing function refers to the function of extracting a bit stream from the light beam or electric waveform transmitted from a transmission medium (e.g., optical fiber or coaxial cable), detecting valid samples therefrom, and outputting an ATM cell. The ATM layer processing function refers to the function of multiplexing/demultiplexing an ATM cell, performing cell routing (including virtual path (VP) routing and virtual channel (VC) routing), creating/deleting a cell header, identifying/extracting a prioritized/non-prioritized cell, controlling a generic flow, processing a signaling VC, and performing OAM (Operation, Administration and Maintenance) functions. Since the physical layer processing function and the ATM layer processing function are well known to those skilled in the art and are not directly related to operation of the present invention, a detailed description of the functions will be avoided herein. However, herein, the ATM layer processing will be limited to the operation by which the ATM interface 181 performs a cell routing operation of demultiplexing a received ATM cell according to ATM virtual circuit and virtual path connections depending on the ATM cell header and outputs the resulting AAL2 cell. During cell routing, the ATM interface 181 is controlled by the processor BTP 110. The processor BTP 110 is connected to the ATM interface 181 and the IATM formatter 188 via a control bus, to provide them with VP/NCI information for cell routing, thereby performing VP/NCI conversion.

The AAL2 synchronizer 182 receives the AAL2 cell processed by the ATM interface 181. The AAL2 cell input to the AAL2 synchronizer 182 is an ATM cell of FIG. 3, from which an ATM cell header is deleted, i.e., the AAL2 CPS-PDU. A user information field INFORMATION of the AAL2 cell includes at least one AAL2 packet header (i.e., AAL2 CPS-packet header) and a payload CPS-INFO. The user information field can include at least one AAL2 packet, i.e., one or more AAL2 packet headers and their associated payloads. For example, in the user information field of the AAL2 cell, real-time voice data and other data having a short length can be multiplexed as a plurality of packets. The AAL2 synchronizer 182 performs an AAL2 synchronizing function of detecting the starting points of one or more AAL2 packets multiplexed in each AAL2 cell of the ATM virtual circuits. By this AAL2 synchronizing function, the following CID changing operation and AAL2 switching operation can be performed on a packet unit basis for every ATM virtual circuit. The AAL2 synchronizing function is performed by using an offset field OSF included in the AAL2 CPS-PDU header and a length indicator LI included in the AAL2 packet header. The starting point of the first AAL2 packet is detected by using the OSF, and starting point of each succeeding AAL2 packets can be detected by using the LI, since it is possible to calculate the length of the AAL2 packet depending on the LI included in the previous AAL2 packet header.

Figure 3:
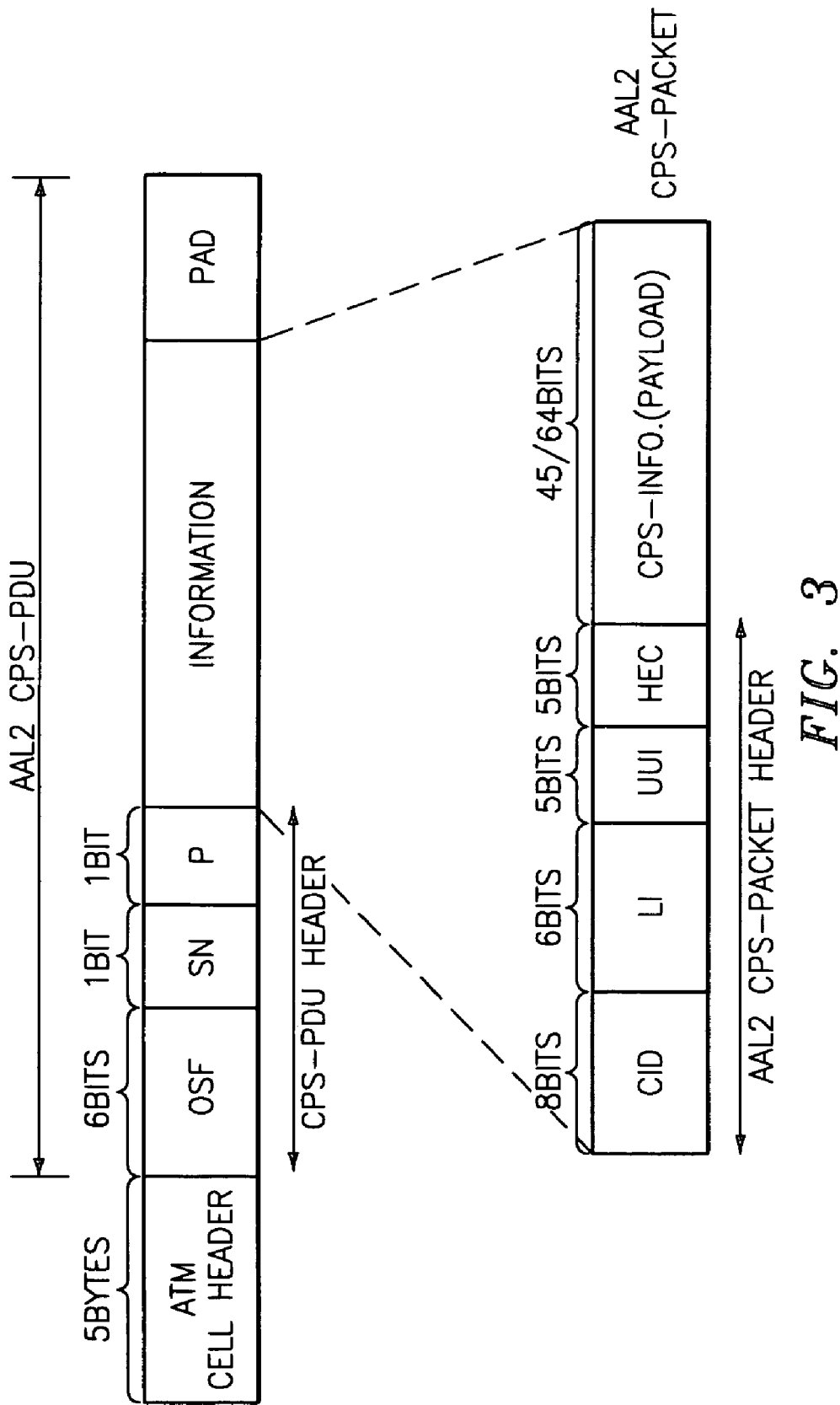
FIG. 3 is a diagram illustrating an AAL2 CPS-PDU (Common Part convergence Sublayer-Protocol Data Unit) format which is applied to the AAL2 interface shown in FIGS. 2A and 2B.

FIG. 3 shows the AAL2 CPS-PDU format defined by ITU-T Recommendation 1.363.2(D), which is input to the AAL2 synchronizer 182 of FIG. 2A.

Referring to FIG. 3, the AAL2 CPS-PDU (i.e., AAL2 cell) is comprised of a 1-byte (8-bit) CPS-PDU header, user information, and a pad. The CPS-PDU header (hereinafter, referred to as an AAL2 cell header) is comprised of a 6-bit OSF, a 1-bit SN (Sequence Number) field, and a 1-bit P (Parity) field. The OSF (Offset Field), information about the starting point of the AAL2 CPS-packet payload CPS-INFO, indicates an interval between the OSF and the CPS-packet payload. The SN indicates a sequence number of the CPS-PDU, and is determined on a modulo-2 basis. The P indicates a parity, and an odd parity is preferably used.

The user information is comprised of a 24-bit (3-byte) AAL2 CPS-packet header (hereinafter, referred to as an AAL2 packet header) and a 45/64-byte payload CPS-INFO. The AAL2 packet header is comprised of a 8-bit CID, a 6-bit LI, a 5-bit UUI (User-to-User Information), and 5-bit HEC (Header Error Control). Here, the CID (Channel Identification) field a unique number identifying an AAL2 packet channel. The CID is assigned by a CID assigning part which will be described later, and is used until the AAL2 channel is released. The LI (Length Indicator) indicates the length of the CPS-packet payload, and can indicate the length of 45 or 64 bytes in maximum since the CPS-packet payload can include information of 45 or 64 bytes in maximum. The UUI is used for communication between CPS users. The HEC is used for detecting errors generated in the CPS-packet header. The CPS-packet payload CPS-INFO is a field for carrying real-time information which has a short length, such as voice data, and can carry a plurality of packets by multiplexing. Here, CPS-INFO can carry packets having a length of 45 or 64 bytes in maximum. Although FIG. 3 shows that the user information field includes one AAL2 packet for simplicity, the user information field can include a plurality of AAL2 packets.

The AAL2 CPS-PDU format shown in FIG. 3 is an AAL2 cell format which is applied to the AAL2 synchronizer 182 after a received ATM cell undergoes physical layer processing and ATM layer processing by the ATM interface 181. The AAL2 cell is applied to the CID changer 184 after synchronization processing by the AAL2 synchronizer 182. The CID changer 184 is required for the following reason. A CID value, which is a unique number for each AAL2 channel, is assigned by the CID assigning part according to ATM virtual circuits (VCs). The CID is used to identify the channels being multiplexed within a single VC. However, a collision can happen between such assigned CIDs after switching operation by the AAL2 switch 186, because the AAL2 switch 186 is working with mapping more than one virtual circuit VC to another. Therefore, the CID changing function is required in order to prevent the collision. More specifically, when the AAL2 packets transmitted through different ATM virtual circuits VCs are AAL2-switched and then transmitted to the same single ATM virtual circuit, their CID values might be identical to each other. Since there is no way to identify the AAL2 packet when there are a plurality of identical CID values on a single ATM virtual circuit VC, it is necessary to change the CID values of the AAL2 packets, which are to be output to the same ATM virtual circuit VC at the same time, so as to be unique to each other. Here, the term "ATM virtual circuit" is used, but the principles can apply to any ATM connections, including virtual paths VPs as well as virtual channels VCs, over which the ATM cell is transferred. In the following description, the ATM connection will be limited to only the virtual channel VC, for convenience of explanation.

The look-up memory 183 stores cell routing (VCI) information, CID routing information, and routing tag (PT) information for ATM switching, as shown in FIGS. 5A and 5B. The above routing-related information is provided by the processor 110 after performing a signaling procedure with the other party during call setup.

The CID changer 184 judges from the CID values stored in the look-up memory 183 whether it is necessary to change the CID values for the AAL2 packets, and when necessary, changes the CID values of the AAL2 packet. That is, the CID changer 184 changes the CID values of the AAL2 packets such that the CID values of the AAL2 packets are not identical to each other, when the AAL2 packets to be output to the same VC at the same time are assigned the identical CID during establishment of the AAL2 packet. For example, when the AAL2 packets of first and second VCs are input with the same CID and they are to be output on a certain single VC, the CID for the AAL2 packet of the first VC can be changed to a new CID which is not used in the AAL2 packet of the other VC. Instead of changing the CID for the AAL2 packet of the first VC, it is also possible to have a method of changing the CID for the AAL2 packet of the second VC. The CID changed at this point is used until the AAL2 packet is released.

Figure 4:
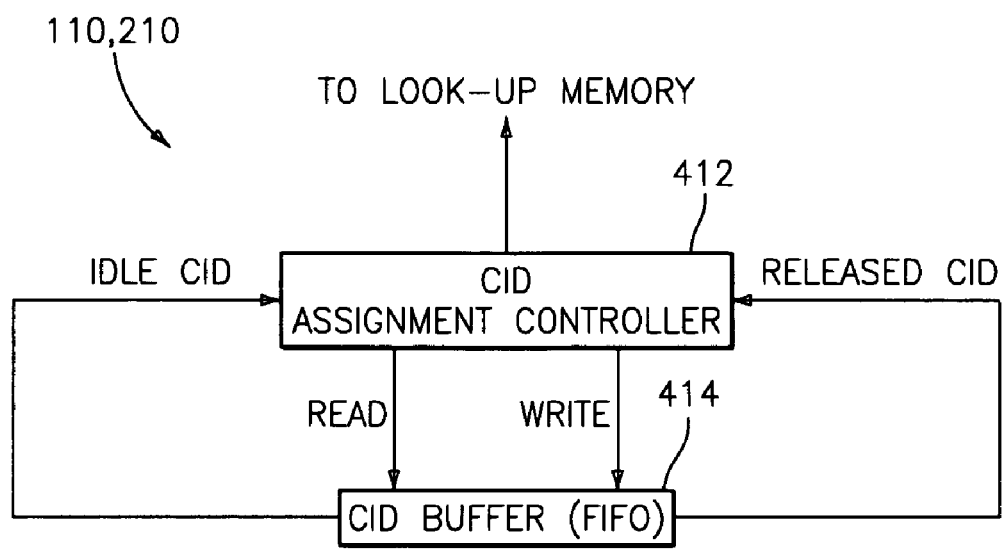
FIG. 4 is a block diagram illustrating the processor of FIGS. 2A and 2B having a CID assignment function according to an embodiment of the present invention.

The processor 110 controls the overall operation of the BTS 100. In one embodiment, the processor 110 controls operation of the ATM switch 172, the AAL2 cell processor 180 and the ATM interface 190. More specifically, the processor 110 performs the function of assigning the VPI/CI value to be used for the ATM virtual circuit, i.e., performs cell routing control. In order to perform the VPCNCI value assigning function, the processor 110 is provided with cell routing (VPI/VCI) information through signaling with the other party during call setup, and controls the ATM interface 181 and the IATM formatter 188 according to the cell routing information. In addition, the processor 110 also performs an ATM cell copy function and an AAL2 packet copy function. In order to perform the ATM cell copy function, the processor 110 provides the IATM formatter 188 with routing tag information and ATM cell header information required for cell copying, and the ATM switch 172 performs a switching operation based on this information. The ATM cell copy function can also be performed by having the processor 110 directly control the ATM switch 172. The AAL2 packet copy function is performed by having the processor 110 control the AAL2 switch 186. Further, the processor 110 performs a function of assigning the CID identifying each AAL2 packet, and FIG. 4 shows the structure of the processor 110 for performing the CID assignment function. The structure of processor 210 is identical.

Referring to FIG. 4, the processor 110 includes a CID assignment controller 412 and a CID buffer 414, and assigns the CID for each AAL2 packet through AAL2 signaling with the other party. The CID buffer 414 stores a plurality of idle CIDs. Upon receipt of an AAL2 channel (packet) establishment request, the CID assignment controller 412 generates a read signal READ and reads a CID stored in the front end of the CID buffer 414 to assign the read CID as the CID for the AAL2 channel (packet). While assigning the CIDs to the AAL2 packets, the CID assignment controller 412 generates a write signal WRITE to write the CID for the released AAL2 channel in the rear end of the CID buffer 414. That is, the CID buffer 414 stores the idle CIDs for assignment, and upon receipt of an AAL2 channel establishment request, the CID assignment controller 412 reads a CID stored in the CID buffer 414 on a FIFO (First-In First-Out) basis to assign the read CID, and then writes the released CID in the CID buffer 414 on the FIFO basis.

Turning back to FIG. 2A, the AAL2 switch 186 performs a switching function on an AAL2 packet unit basis, under the control of the processor 110. Further, the AAL2 switch 186 can perform a copy function on an AAL2 packet unit basis. Here, the copy function refers to simultaneously outputting a specific AAL2 packet to several ATM VCs. For this copy function, it is necessary to use a CID to separately identify the packet to be copied. Since information about the CID to be used for the packet to be copied can also be stored in the look-up memory 183, the AAL2 switch 186 determines a CID to be used for the packet to be copied by using the information stored in the look-up memory 183 and performs the copy function for the AAL2 packet indicated by the determined CID.

The AAL2 formatter 187 assembles the AAL2 packets to be multiplexed to the same ATM VC out of the AAL2 packets switched by the AAL2 switch 186, to generate an AAL2 CPS-PDU (i.e., AAL2 cell). That is, the AAL2 formatter 187 multiplexes the AAL2 packets, generates an AAL2 cell having the same format as the AAL2 cell received from the AAL2 synchronizer 182, and outputs the generated AAL2 cell to the IATM formatter 188.

The IATM formatter 188, which is connected to the processor 110 via the control bus, converts the AAL2 cell, to which a plurality of AAL2 packets are multiplexed, into an internal ATM cell used in the system. Here, the operation of generating an internal ATM cell refers to the operation of adding, at the head of the internal ATM cell, a routing tag and an ATM cell header for enabling ATM switching. Information about the routing tag and the ATM cell header is provided from the processor 110.

The ATM switch 172 switches the internal ATM cell generated by the IATM formatter 188. A general ATM switch can be used for the ATM switch 172.

The AAL2 cell processor 180 inside the ATM cell processor 170 has the structure shown in FIG. 2A and performs the AAL2 processing function as described above. A description will be now made regarding an AAL2 processing operation performed by the device according to an embodiment of the present invention. FIGS. 5A to 11B are diagrams for explaining the AAL2 processing operation and its associated ATM switching operation according to the preferred embodiment of the present invention.

FIGS. 5A and 5B show the structure of the routing tables for performing an operation according to the preferred embodiment of the present invention. Such routing tables can be implemented in the look-up memory 183 of FIG. 2A.

More specifically, FIG. 5A shows a routing table according to the time for processing a current mini-cell (i.e., AAL2 packet), and FIG. 5B shows a routing table according to the time for processing the next mini-cell. In the routing tables, $VCI_I$ and $VCI_O$, which indicate input and output virtual channel identifiers, respectively, are provided from the processor 110 to the AAL2 switch 186. CID, and $CID_O$, which indicate AAL2 input and output packet numbers, respectively, are provided from the processor 110 to the CID changer 184. $PT_I$, and $PT_O$, which indicate ATM cell input and output ports, respectively, of the ATM switch 172, are provided to the IATM formatter 188 under the control of the processor 110.

Figure 6:
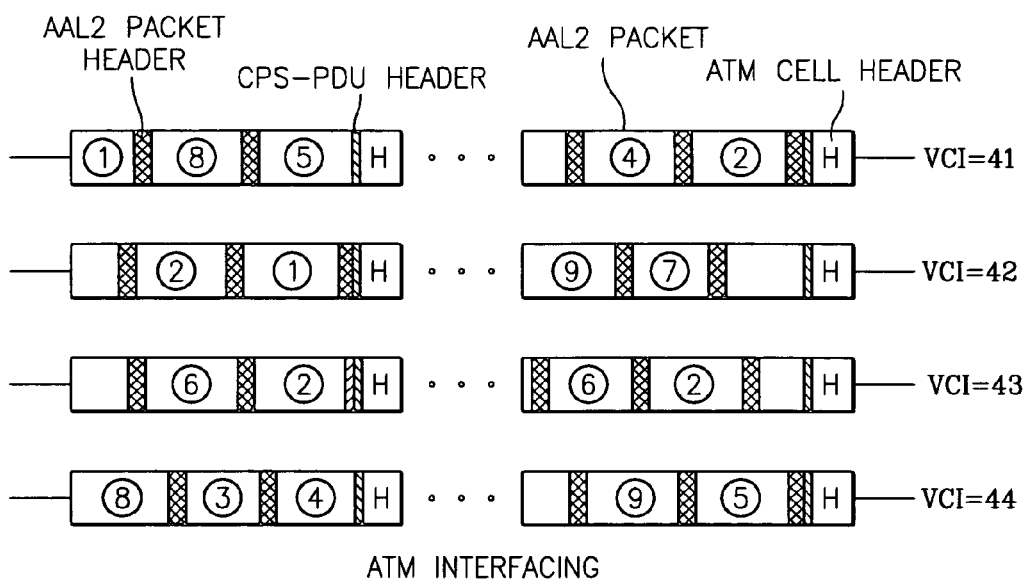
FIG. 6 is a diagram illustrating AAL2 packets processed by the ATM interface of FIGS. 2A and 2B according to an embodiment of the present invention.

Now, say that an ATM cell has been input to the ATM cell processor 180, then the ATM interface 181 performs ATM layer processing on the input ATM cell and outputs the resulting processed ATM cell. As shown in FIG. 6, this ATM cell includes an AAL2 CPS-PDU in which a plurality of AAL2 packets are multiplexed. In FIG. 6, "H" denotes the ATM cell header shown in FIG. 3, hatched blocks denote the CPS-PDU headers, latticed blocks denote the AAL2 packet headers, and circled numerals 1 to 8 denote CIDs of the AAL2 packets. For convenience of explanation, FIG. 6 shows that the CIDs of the AAL2 packets have already been assigned. However, it should be noted that the CID is assigned on a packet unit basis when an AAL2 channel establishment request occurs, and is used until the channel is released.

The AAL2 synchronizer 182 in the AAL2 cell processor 180 receives the AAL2 cell (AAL2 CPS-PDU) in the format of FIG. 6 from the ATM interface 181. At this point, the AAL2 packets included in the AAL2 cells of different ATM VCs have not been synchronized with each other. Therefore, the AAL2 synchronizer 182 identifies the AAL2 packet and synchronizes the AAL2 packets of the different ATM VCs with each other. Next, the CID changer 184 receives the cells, synchronized according to the different ATM VCs, and changes the CID on a packet unit basis, when necessary. When this happens, the CID changer 184 is provided with a new CID value changed from the original CID value during channel establishment from the processor 110 having the CID assignment function, and this CID value is stored in the look-up memory 183 and maintained until the channel is released.

Figure 7:
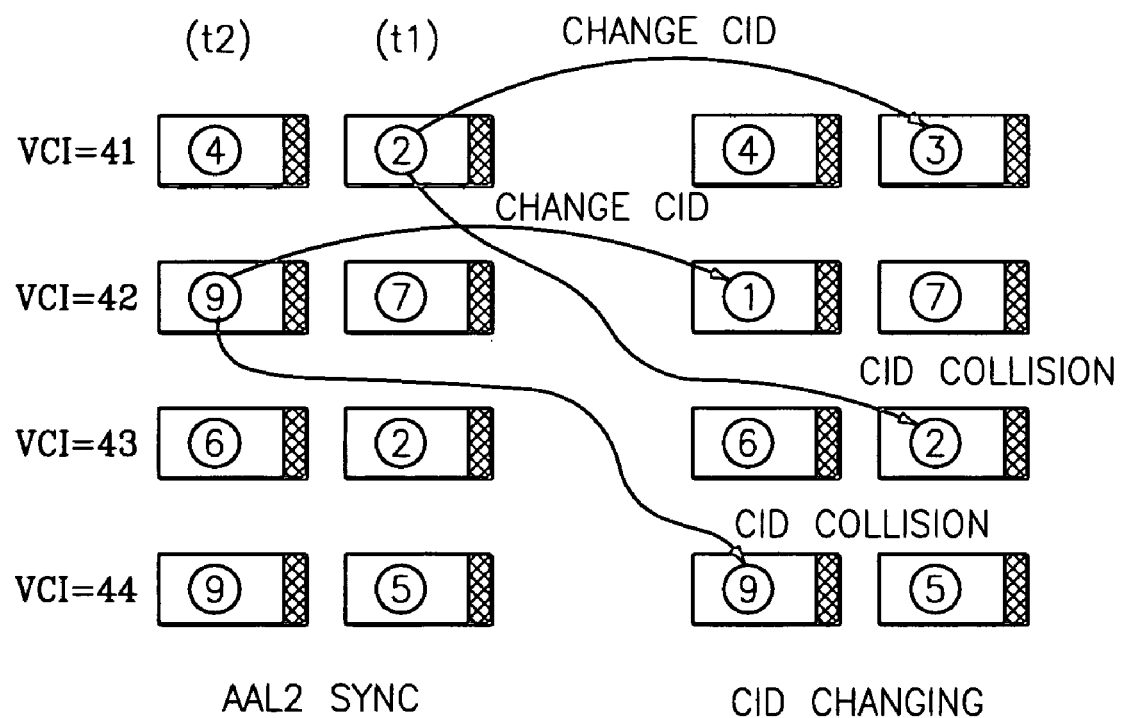
FIG. 7 is a diagram illustrating AAL2 packets processed by the AAL2 synchronizer and the CID changer of FIGS. 2A and 2B according to an embodiment of the present invention.

Referring to FIG. 7, at the current time t1, the CID of the VCI=41 AAL2 packet and the CID of the VCI=43 AAL2 packet are both '2', and at the next time $t_2$, the CID of the VCI=42 AAL2 packet and the CID of the VCI=44 AAL2 packet are both '9'. This, of itself, is not a problem. However, both the '2' VCI=41 AAL2 packet and the '2' VCI=43 AAL2 packet are mapped to the same outgoing VC, $VCI_O$, 83, as shown in FIG. 5A. In the same manner, both the '9' VCI=42 AAL2 packet and the '9' VCI=44 packet are mapped to the same outgoing VC, $VCI_O$ 84, as shown in FIG. 5B. Therefore, the CID changer 184 needs to change the CID for this and other cases where the AAL2 packets of different ATM VCs having the identical CID are multiplexed to the identical VCI, so as to prevent CID collision. For example, the CID changer 184 performs CID changing on the VCI=41 AAL2 packet at the current time t1 and the VCI=42 AAL2 packet at the next time $t_2$. By this CID changing operation, the CID of the VCI=41 AAL2 packet is changed from '2' to '3' at the current time t1, and the CID of the VCI=42 AAL2 packet is changed from '9' to '1' at the next time $t_2$. Therefore, although the VCI=41 AAL2 packet and the VCI=43 AAL2 packet are multiplexed in the same VC at the current time t1 or the VCI=42 AAL2 packet and the VCI=44 AAL2 packet are multiplexed in the same VC at the next time $t_2$ by the following AAL2 switching operation, the CIDs of the multiplexed AAL2 packets do not overlap. These newly changed CID values are provided from the CID assignment controller 412 of the processor 110.

Figure 8A:
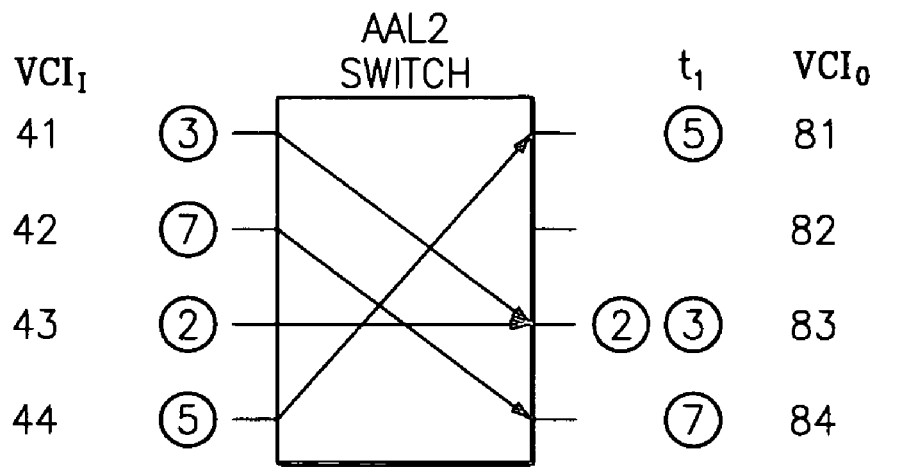
FIGS. 8A and 8B are diagrams illustrating AAL2 packets processed by the AAL2 switch of FIGS. 2A and 2B according to an embodiment of the present invention.
Figure 8B:
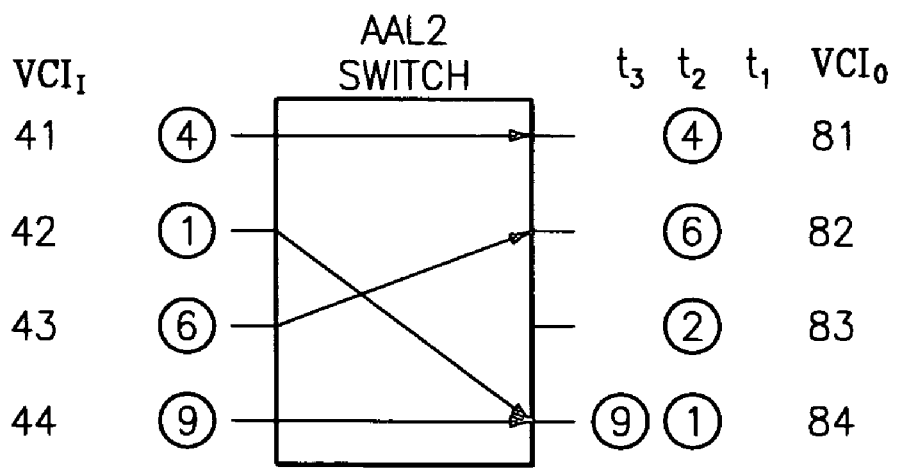

The AAL2 switch 186 performs the switching operation shown in FIGS. 8A and 8B on the AAL2 packets on which the CID changing function has been performed on a packet unit basis. At this point, the AAL2 switch 186 performs the switching operation using the $VCI_I$ and $VCI_O$ values in the routing tables shown in FIGS. 5A and 5B, provided from the processor 110.

Referring to FIG. 8A, at the current mini-cell (AAL2 packet) time $t_I$, the AAL2 switch 186 performs switching such that a $VCI_I$=41 packet '3' is output to $VCI_O$=83, a $VCI_I$=42 packet '7' is output to $VCI_O$=84, a $VCI_I$=43 packet '2' is output to $VCI_O$=83, and a $VCI_I$=44 packet '5' is output to $VCI_O$=81.

Referring to FIG. 8B, at the next mini-cell (AAL2 packet) time $t_2$, the AAL2 switch 186 performs switching such that a $VCI_I$=41 packet '4' is output to $VCI_O$=81, a $VCI_I$=42 packet '1' is output to $VCI_O$=84, a $VCI_I$=43 packet '6' is output to $VCI_O$=82, and a $VCI_I$=44 packet '9' is output to $VCI_O$=84.

Since the packet length is not fixed but variable as shown in FIG. 3, the AAL2 switch 186 is difficult to perform in hardware like the ATM switch 172. Instead, it is preferable for the AAL2 switch 186 to be implemented in software as a packet switch.

Figure 9:
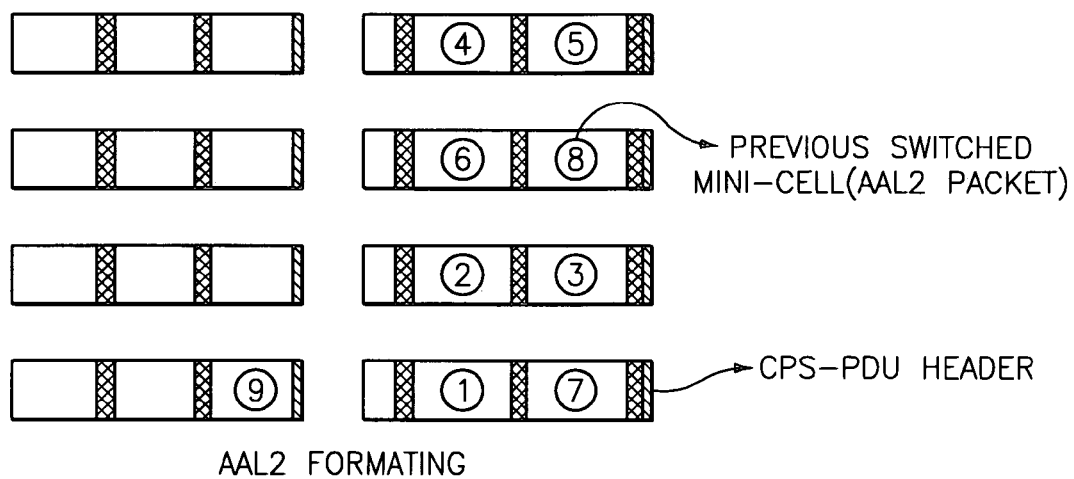
FIG. 9 is a diagram illustrating AAL2 packets processed by the AAL2 formatter of FIGS. 2A and 2B according to an embodiment of the present invention.

The AAL2 formatter 187 multiplexes the AAL2 packets, which were switched to the same ATM VC by the AAL2 switch 186, to generate a single AAL2 cell (AAL2 CPS-PDU) in the format of FIG. 3. The generated AAL2 cell is shown in FIG. 9, by way of example. Here, the packet '8' is a previously switched AAL2 packet.

Figure 10:
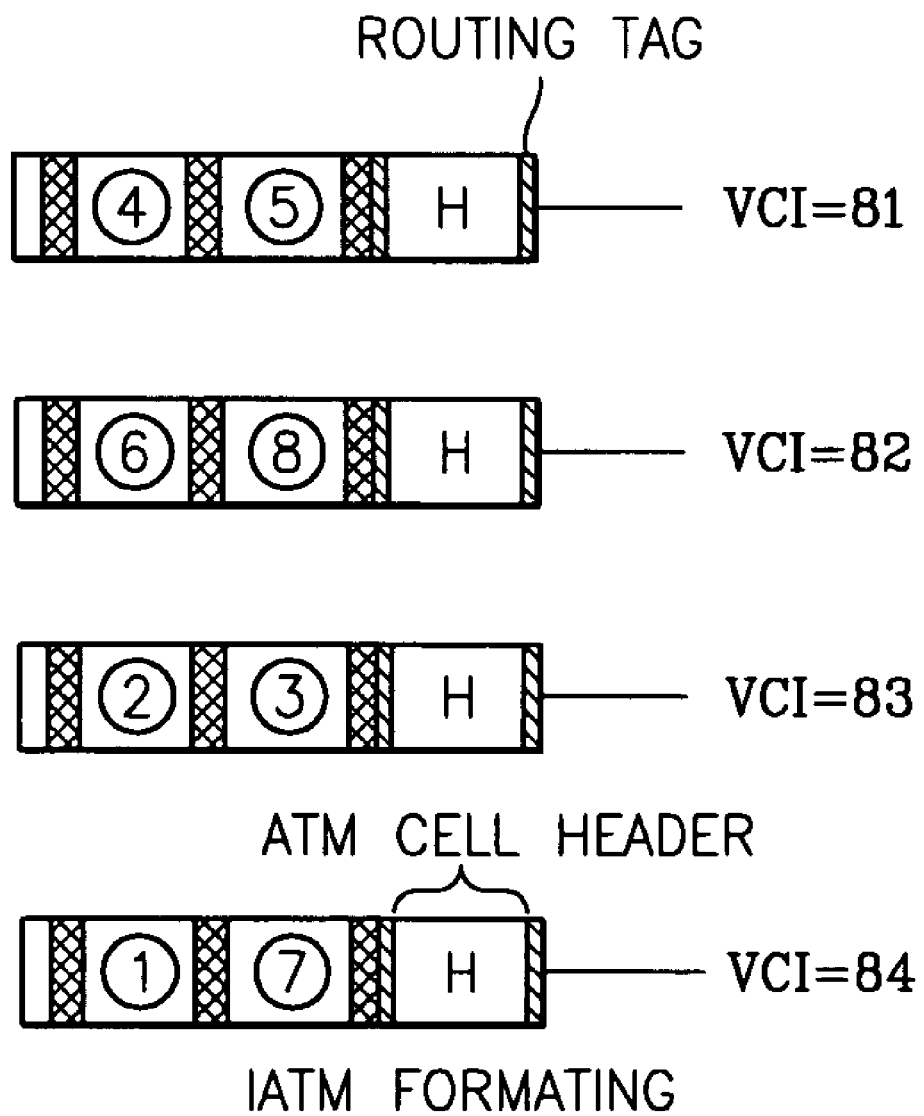
FIG. 10 is a diagram illustrating an internal ATM (IATM) cell processed by the IATM formatter of FIGS. 2A and 2B according to an embodiment of the present invention.

The IATM formatter 188 converts the AAL2 cell output from the AAL2 formatter 187 to an IATM cell in the format of FIG. 10, which is the proper format to be switched by the ATM switch 172. At this point, the routing tag and ATM cell header are added at the head of each cell.

Figure 11A:
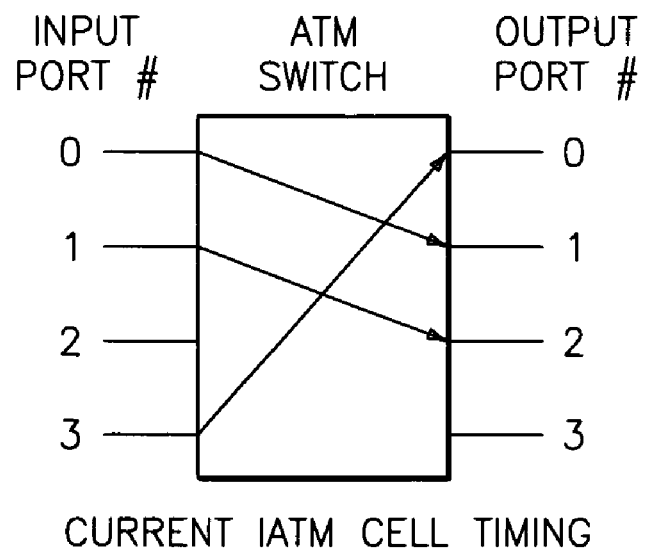
FIGS. 11A and 11B are diagrams illustrating switching of an IATM cell processed by the ATM switch of FIGS. 2A and 2B according to an embodiment of the present invention.
Figure 11B:
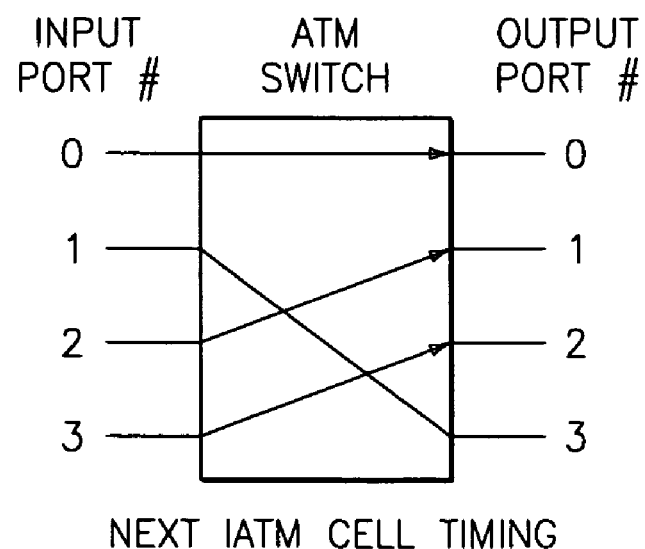

The ATM switch 172 receives the IATM cell generated by the IATM formatter 188 and performs switching as shown in FIGS. 11A and 11B. At this point, the ATM switch 172 performs the switching operation using the routing tag information (PTO value) on the routing table shown in FIGS. 5A and 5B, provided from the processor 110.

Referring to FIG. 11A, at the current IATM cell time, the ATM switch 172 performs switching such that a cell input at an input port #0 is output to an output port #1, a cell input at an input port #1 is output to an output port #2, a cell input at a port #2 is output to an output port #3, and a cell input at an input port #3 is output to an output port #0.

Referring to FIG. 11B, at the next IATM cell time, the ATM switch 172 performs switching such that a cell input at an input port #0 is output to an output port #0, a cell input at an input port #1 is output to an output port #3, a cell input at an input port #2 is output to an output port #1, and a cell input at an input port #3 is output to an output port #2.

One IATM cell time corresponds to a plurality of AAL2 packet (mini-cell, CPS-packet) times. Since the AAL2 packet size is variable, the number of the AAL2 packet times corresponding to one IATM cell time can be varied. That is, although the IATM cell time is fixed, the mini-cell time is variable depending on the AAL2 packet size.

Turning back to FIG. 1, the processors BTP 110, BMP (BSC Main Processor) 210 and MMP (MSC Main Processor) 310 in the BTS 100, BSC 200 and MSC 300, respectively, perform inter-processor communication (IPC) by exchanging ATM cells with each other. The BSC 200 and the MSC 300 include application programs 290 and 390 shown in FIG. 1 for performing various operations. Further, the ATM interface 370 in the MSC 300 can also be connected to either another MSC or to other networks through an ATM switch or a STM switch. That is, the MSC 300 shown in FIG. 1 can be connected to another MSC and other networks via an ATM NNI (Network Node Interface).

Figure 13:
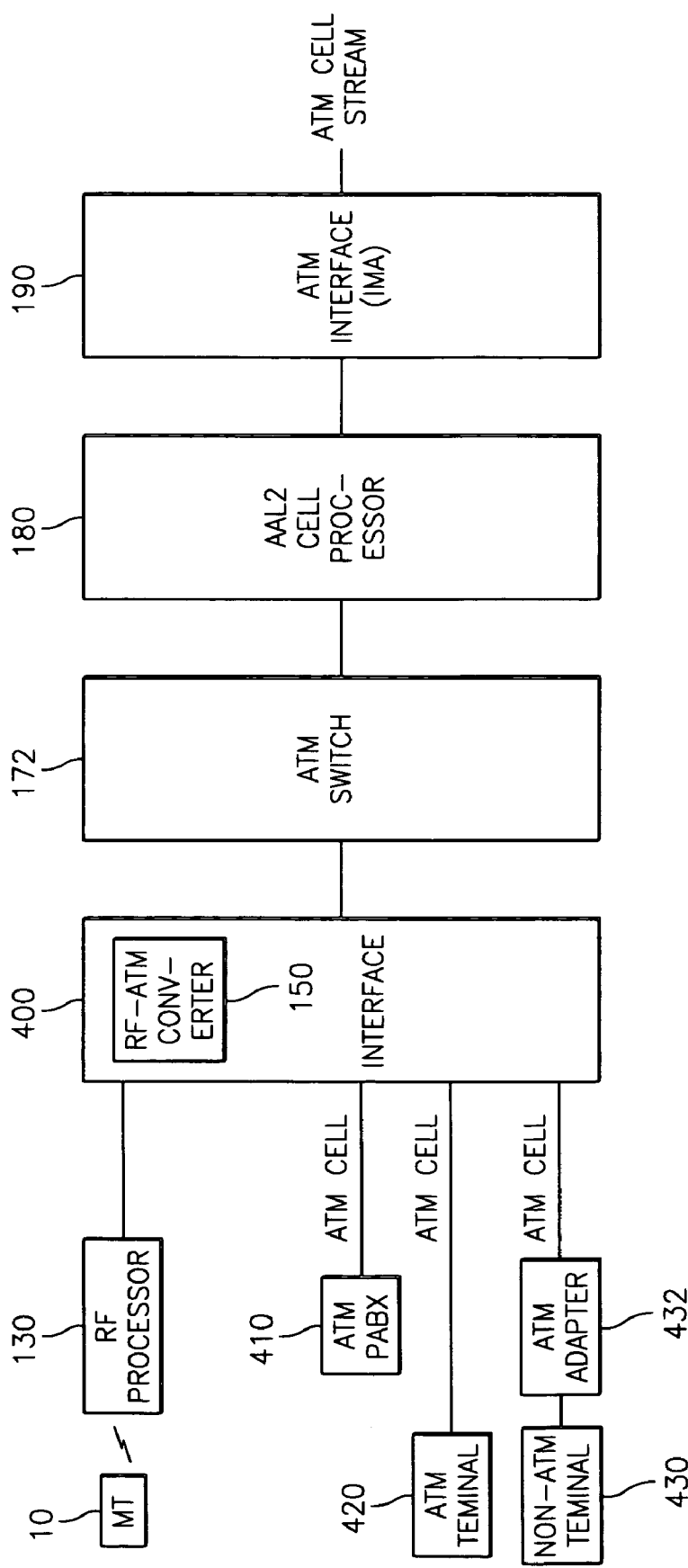
FIG. 13 is a block diagram for explaining various exemplary applications of the system according to an embodiment of the present invention.

FIG. 13 shows a block diagram explaining various exemplary applications of the ATM cell processing system according to an embodiment of the present invention.

Referring to FIG. 13, the novel ATM cell processing system includes an ATM switch 172, an AAL2 cell processor 180 and an ATM (IMA) interface 190, as shown in FIG. 1. Various service devices can be connected to the ATM switch 172 via an interface 400. That is, a mobile terminal (MT) 10 can be connected to the interface 400 via the RF processor 130 of FIG. 1. In this case, the interface 400 converts radio information received from the mobile terminal 10 to a format proper for the fixed network after RF processing in the RF processor 130, and converts information received from the fixed network to a format proper for the radio network. This operation corresponds to an operation of the RF-ATM converter 150 of FIG. 1.

In addition, an ATM PABX (Private Automatic Branch Exchange) 410 and an ATM terminal 420 can also be connected to the interface 400. Further, a non-ATM terminal 430 can also be connected to the interface 400 via an ATM adapter 432. Here, since the information received from the ATM PABX 410, the ATM terminal 420 and the non-ATM terminal 430 have the format suitable for the fixed network, i.e., the ATM cell format, the interface 400 can directly provide the input ATM cell to the ATM switch 172, without separate processing.

As described above, the novel mobile communication system uses not only the fundamental ATM technique but also the AAL2 and IMA techniques. By using the ATM technique, it is possible to increase transmission efficiency and facilitate multimedia traffic processing by statistical multiplexing. In addition, it is possible to increase transmission efficiency within virtual circuits by using the AAL2 technique, and increase the utilization efficiency of the physical links by using the IMA technique.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A base station controller having a plurality of physical links between a base station transceiver and a mobile switching center in a mobile communication system, comprising:

an ATM switch for switching an input ATM cell stream according to routing information;

an ATM interface having the plurality of physical links, for transmitting an ATM cell stream, and IMA processing ATM cells received over the plurality of physical links to restore the received ATM cells into one ATM cell stream; and an AAL2 cell processor for detecting the starting point of at least one AAL2 packet, directly transmitting an ATM cell stream switched by the ATM switch through a first path, receiving a restored ATM cell stream through a second path, switching at least one AAL2 packet multiplexed within each ATM cell in the received ATM cell stream according to routing information provided during call setup, multiplexing the switched AAL2 packets according to ATM connections, changing a CID (Channel Identification) of at least one AAL2 packet if it is determined that there is more than one AAL2 packet to be switched to an identical ATM connection at the same time, and creating an internal ATM cell having a format for switching by the ATM switch,
wherein the CID is changed in order to be a unique number for identifying an identical ATM connection at the same time.

2. The base station controller as claimed in claim 1, wherein the ATM interface further comprises:
an IMA processor for IMA processing the received ATM cells, to restore the IMA processed ATM cells to one ATM cell stream.

3. The base station controller as claimed in claim 1, wherein the AAL2 cell processor comprises:
an ATM layer processing interface for ATM layer processing the received ATM cell stream according to routing information provided during call setup, and outputting the ATM layer-processed received ATM cells as an input AAL2 cell;
an AAL2 synchronizer for synchronizing AAL2 packets by detecting a starting point of each AAL2 packet which is included in the input AAL2 cell on a packet unit basis;
an AAL2 switch for switching the synchronized AAL2 packets according to the routing information;
an AAL2 formatter for multiplexing the switched AAL2 packets according to virtual channel information, and generating an output AAL2 cell having the same format as the input AAL2 cell;
a CID changer interconnected between the AAL2 synchronizer and the AAL2 switch, for determining whether there are packets to be switched to an identical ATM connection at the same time out of the packets to be switched by the AAL2 switch by using the routing information, and changing, when there are said packets, the CIDs of the packets such that the CIDs of the packets are not identical to each other; and
an internal ATM cell formatter for attaching an ATM cell header and a routing tag to said output AAL2 cell and generating a corresponding internal ATM cell.

4. A base station transceiver subsystem in a mobile communication system, comprising:
an RF (Radio Frequency) processor having a wireless connection to a mobile terminal, for processing information transmitted to and received from the mobile terminal;
a converter for converting the information received from the RF processor to an ATM cell stream, and an input ATM cell stream to a format for processing by the RF processor;
an ATM switch for switching the converted ATM cell stream according to routing information provided during call setup; an AAL2 cell processor for detecting the starting point of at least one AAL2 packet, directly outputting the switched ATM cell stream through a first path, switching at least one AAL2 packet multiplexed within each ATM cell in the ATM cell stream received through a second path according to the routing information, multiplexing the switched AAL2 packets according to ATM connections, changing a CID (Channel Identification) of at least one AAL2 packet if it is determined that there is more than one AAL2 packet to be switched to an identical ATM connection at the same time, and creating an internal ATM cell having a format for switching by the ATM switch; and
an ATM interface having a plurality of physical links, for IMA processing the ATM cell stream output through the first path to transmit the ATM cell stream to the plurality of physical links, and IMA processing ATM cells received over the physical links to restore the received ATM cells into one ATM cell stream and output the ATM cell stream through the second path.

5. The base station transceiver subsystem as claimed in claim 4, wherein the ATM interface further comprises:
an IMA processor for IMA processing the received ATM cells, to restore the IMA processed ATM cells to the ATM cell stream.

6. The base station transceiver subsystem as claimed in claim 4, wherein the AAL2 cell processor comprises:
an ATM layer processing interface for ATM layer processing the received ATM cell according to the routing information, and outputting the ATM layer-processed received ATM cells as an input AAL2 cell;
an AAL2 synchronizer for synchronizing AAL2 packets by detecting a starting point of each AAL2 packet which is included in the input AAL2 cell on a packet unit basis;
an AAL2 switch for switching the synchronized AAL2 packets according to the routing information;
an AAL2 formatter for multiplexing the switched AAL2 packets according to virtual channels, and generating an output AAL2 cell having the same format as the input AAL2 cell;
a CID changer interconnected between the AAL2 synchronizer and the AAL2 switch, for determining whether there are packets to be switched to an identical ATM connection at the same time out of the packets to be switched by the AAL2 switch by using the cell routing information, and changing, when there are said packets, the CIDs of the packets such that the CIDs of the packets are not identical to each other; and
an internal ATM cell formatter for attaching an ATM cell header and a routing tag to said output AAL2 cell and generating a corresponding internal ATM cell.

7. A mobile communication system including a base station having a wireless connection to a mobile terminal, and a mobile switching center in communication with the base station, comprising:
a base station transceiver including;
an RF processor for processing information transmitted to and received from the mobile terminal;
a converter for converting the information received from the RF processor to an ATM cell stream, and an input ATM cell stream to a format for processing by the RF processor;
a first ATM cell processor having a first path where the first ATM cell processor directly outputs the input ATM cell stream converted by the converter, and a second path where the first ATM cell processor multiplexes an input ATM cell stream after detecting the starting point of at least one AAL2 packet, AAL2 switching, changing a CID (Channel Identification) of at least one AAL2 packet if it is determined that there is more than one AAL2 packet to be switched to an identical ATM connection at the same time, and outputs the multiplexed ATM cell stream to the converter after ATM switching; and
a first ATM interface having a plurality of first physical links, for IMA processing the ATM cell stream output through the first path to transmit the ATM cell stream to the first physical links, and IMA processing the ATM cells received over the first physical links to restore the received ATM cells into one ATM cell stream and output the ATM cell stream through the second path;

a base station controller including;
a second ATM interface having a plurality of second physical links, connectable to the first ATM interface through the second physical links;
a second ATM cell processor having a first path where the second ATM cell processor directly outputs an ATM cell stream received at the second ATM interface, and a second path where the second ATM cell processor multiplexes an input ATM cell stream with respect to each ATM cell after detecting the starting point of at least one AAL2 packet, AAL2 switching, changing the CID (Channel Identification) of at least one AAL2 packet if it is determined that there is more than one AAL2 packet to be switched to an identical ATM connection at the same time, and outputs the multiplexed ATM cell stream to the second ATM interface after ATM switching; and
a third ATM interface having a plurality of third physical links, for IMA processing the ATM cell stream output through the first path of the second ATM cell processor to transmit the ATM cell stream over the third physical links, and IMA processing the ATM cells received over the third physical links to restore the received ATM cells to an ATM cell stream and output the restored ATM cell stream through the second path of the second ATM cell processor; and
a mobile switching center including;
a fourth ATM interface having a plurality of fourth physical links, connectable to the third ATM interface through the fourth physical links;
a third ATM cell processor having a first path where the third ATM cell processor directly outputs the ATM cell stream received at the fourth ATM interface, and a second path where the third ATM cell processor multiplexes an input ATM cell stream after detecting the starting point of at least one AAL2 packet, AAL2 switching, changing the CID (Channel Identification) of at least one AAL2 packet if it is determined that there is more than one AAL2 packet to be switched to an identical ATM connection at the same time, and outputs the multiplexed ATM cell stream to the fourth ATM interface after ATM switching; and
a fifth ATM interface having a plurality of fifth physical links, for IMA processing the ATM cell stream output through the first path of the third ATM cell processor to transmit the ATM cell stream over the fifth physical links, and IMA processing the ATM cells received over the fifth physical links to restore the received ATM cells to an ATM cell stream and output the restored ATM cell stream through the second path of the third ATM cell processor.

8. The mobile communication system as claimed in claim 7, wherein the fifth ATM interface is connected to at least one other mobile switching center.

9. The mobile communication system as claimed in claim 7, wherein the fifth ATM interface is connected to at least one ATM switch.

10. The mobile communication system as claimed in claim 7, wherein the fifth ATM interface is connected to at least one STM (Synchronous Transfer Mode) switch.

11. The mobile communication system as claimed in claim 7, wherein each of the first, second, and third ATM cell processors comprises:
an ATM switch for switching the ATM cell stream according to routing information;
an ATM layer processing interface for ATM layer processing the received ATM cell according to the routing information, and outputting the ATM layer-processed received ATM cells as an input AAL2 cell;
an AAL2 synchronizer for synchronizing AAL2 packets by detecting a starting point of each AAL2 packet which is included in the input AAL2 cell on a packet unit basis;
an AAL2 switch for switching the synchronized AAL2 packets according to the routing information;
an AAL2 formatter for multiplexing the switched AAL2 packets according to virtual channels, and generating an output AAL2 cell having the same format as the input AAL2 cell;
a CID changer interconnected between the AAL2 synchronizer and the AAL2 switch, for determining whether there are packets to be switched to an identical ATM connection at the same time out of the packets to be switched by the AAL2 switch by using the cell routing information, and changing, when there are said packets, the CIDs of the packets such that the CIDs of the packets are not identical to each other; and
an internal ATM cell formatter for attaching an ATM cell header and a routing tag to said output AAL2 cell and generating a corresponding internal ATM cell.

* * * * *